United States Patent [19]
Aoki

[11] Patent Number: 5,982,440
[45] Date of Patent: Nov. 9, 1999

[54] METHOD AND APPARATUS FOR PRODUCING SLOW-MOTION PICTURE SIGNAL CHANGING SMOOTHLY FROM COMPRESSION CODED PICTURE SIGNAL

[75] Inventor: Masayuki Aoki, Tokyo, Japan

[73] Assignee: NEC Corporation, Tokyo, Japan

[21] Appl. No.: 08/932,220

[22] Filed: Sep. 17, 1997

[30] Foreign Application Priority Data

Sep. 17, 1996 [JP] Japan ................................ 8-244970

[51] Int. Cl.⁶ .............................. H04N 7/12; H04N 7/01; H04N 5/14
[52] U.S. Cl. .................. 348/416; 348/439; 348/699; 386/68; 386/111
[58] Field of Search ..................... 348/423, 416, 348/424, 419, 425, 402, 426, 699, 700, 845, 405, 384; 386/7, 33, 68, 81, 82, 111, 112; 382/232, 234, 248; H04N 7/12, 7/01, 5/14

[56] References Cited

U.S. PATENT DOCUMENTS

| | | | |
|---|---|---|---|
| 5,351,083 | 9/1994 | Tsukagoshi | 348/384 |
| 5,524,067 | 6/1996 | Miyake et al. | 382/234 |
| 5,542,008 | 7/1996 | Sugahara et al. | 382/248 |
| 5,598,483 | 1/1997 | Purcell et al. | 382/232 |
| 5,748,243 | 5/1998 | Suzuki | 348/405 |
| 5,751,888 | 5/1998 | Fukuchi et al. | 386/68 |

FOREIGN PATENT DOCUMENTS

| | | |
|---|---|---|
| 178270 | 6/1994 | Japan . |
| 8-223533 | 8/1996 | Japan . |

*Primary Examiner*—Jimmy P. Chin
*Assistant Examiner*—Tung Vo
*Attorney, Agent, or Firm*—Scully, Scott, Murphy & Presser

[57] ABSTRACT

In a device for reproducing front MPEG 2 code a sequence of motion pictures, a slow-motion picture signal for N times slow motion playing is produced by combining the sequence of motion pictures reproduced and a plurality of interpolation picture sequences. Each of the interpolation picture sequences is interpolated between each one of the motion pictures and a succeeding one of the notion pictures. Each of the interpolation picture sequences comprises (n−1) interpolation pictures and in produced by calculating, from the motion vector data included in the MPEG 2, a motion vector between each one of the motion pictures and a succeeding one of the motion pictures, then calculating, from the motion vector, (n−1) interpolation motion vectors, and then producing the (n−1) interpolation pictures from the (n−1) interpolation vectors and the succeeding motion picture.

11 Claims, 4 Drawing Sheets

METHOD AND APPARATUS FOR PRODUCING SLOW-MOTION PICTURE SIGNAL CHANGING SMOOTHLY FROM COMPRESSION CODED PICTURE SIGNAL

BACKGROUND OF THE INVENTION

This invention relates to a picture signal reproducing apparatus capable of producing a slow-motion picture signal or slow-motion image signal and, more particularly, to an efficient scheme for interpolating original pictures data such as original frame/field pictures to produce the slow-motion picture signal.

In the art of digital moving picture, digital data representative of a sequence of original moving pictures must be compressed. Generally, large amounts of data art required to define the sequence of original roving pictures. Transmitting/recording of such large amounts of data results in ineffectual use of the resources such as the available radio frequency spectrum. In view of the above, the data must be compressed.

One standard that has been adopted for encoding a sequence of original moving pictures into a compression coded picture data is the Motion Picture Experts Group (MPEC) standard, more particularly, the MPEG-1 (MPEG Phase-1) or the MPEG-2 (MPEG Phase-2) standard. The data coded according to MPEG standard is called "MPEG code" or a "MPEG data". MPEG-1 code is employed in a Video CD and so on while MPEG-2 is employed in digital broadcasting and recording media such as a DVD (digital video disc). Both of MPEG-1 code and MPEG-2 code contain motion vector data. MPEG code is decoded with reference to the motion vector data by a picture signal decompression processor included in a picture reproducing apparatus, to produce the moving picture sequence.

A conventional picture signal reproducing apparatus comprises a picture signal decompression processor, a memory or a display buffer, and a buffer controlling unit. The picture signal decompression processor receives an MPEG code signal having the MPEG code sequence and decodes the MPEG code with reference to the motion vector data to produce a group of decoded pictures corresponding to the sequence of original moving pictures. The display buffer receives the decoded pictures from the picture signal decompression processor and temporarily stores the decoded pictures as reproduced pictures. The buffer controlling unit controls the buffer to read out the reproduced pictures in the order of displaying the reproduced pictures to produce a reproduced picture signal.

The conventional picture signal reproducing apparatus produces a slow-motion picture signal from MPEG code signal, as follows. In case of playing the reproduced pictures in slow motion which has a slow speed corresponding to 1/n of the normal speed, the buffer controlling unit controls the display buffer to repeatedly read out each of the reproduced pictures n times. Namely, in three times slow motion, the picture reproducing apparatus repeatedly produces each of the reproduced pictures three times.

However, the slow notion picture reproduced by the conventional picture signal reproducing apparatus gives a user unnatural impression. A particular one of the reproduced pictures is repeatedly displayed n-times and then in replaced with succeeding one of reproduced pictures. And then the succeeding reproduced picture is also repeatedly displayed n-times. Thus, the user watches, on a display screen, reproduced pictures changing from one to another in a longer period or cycle than a predetermined period at the normal speed. Consequently, the user feels that objects in the pictures on the display screen rapidly move at a time instant when changing from one picture to another picture. As a result, the user has unnatural impression for the moving picture.

Furthermore, a picture signal reproduction apparatus providing smooth slow-motion pictures is disclosed in Japanese Unexamined Patent Publication (JP-A) No. 178270/94. This apparatus is not for decoding compression data such MPEG code, but for processing original pictures themselves. This apparatus analogously processes a plurality of original pictures such as frame pictures to predict motion vectors between the original pictures, thereby producing interpolation pictures by the use of the motion vectors. In order to carry out the above-mentioned processing, this apparatus has a complicated structure and makes no use of digital advantages possessed by MPEG code.

SUMMARY OF THE INVENTION

It is an object of this invention to provide a method for producing, from a compression coded picture signal, a slow-motion picture signal having slow-motion pictures changing smoothly.

This invention provides a method for producing the slow-motion picture signal from a compression coded picture signal produced by a compression coding a sequence of original moving pictures. The compression coded picture signal has motion vector data. The slow-motion picture signal comprises a sequence of reproduced pictures and a plurality of interpolation picture sequences. The sequence of reproduced pictures are substantially the same pictures an the sequence of the original moving pictures, respectively. Each one of the plurality of interpolation picture sequences comprises (n−1) interpolation pictures, where n is a natural number. Each one of the plurality of interpolation picture sequences is interpolated between a particular one of the reproduced pictures and a preceding one of the reproduced pictures immediately preceding the particular reproduced picture. According to the method of this invention, a compression coded picture signal is decoded with reference to the motion vector data to produce the sequence of reproduced pictures and a plurality of produced motion vectors, each of which in a motion vector between the particular reproduced picture and the preceding reproduced picture. From one of the produced notion vectors, (n−1) interpolation motion vectors for the (n−1) interpolation pictures are produced. The (n−1) interpolation pictures are produced from the (n−1) interpolation motion vectors and the each one reproduced picture. Repeatedly executing the just above-mentioned two processes for different ones of the reproduced pictures, the plurality of interpolation picture sequences are all produced. The plurality of interpolation picture sequences are temporarily stored in a display buffer, and then the sequence of reproduced pictures and the plurality of interpolation picture sequences are combined to produce the slow-motion picture signal.

DESCRIPTION OF THE PREFERRED EMBODIMENT

Prior to description of embodiments of the present invention, a conventional picture signal reproducing apparatus and the method employed therein for producing slow-motion picture signal will be described for a better understanding of the present invention.

In examples described below, MPEG-2 code is used as a compression coded picture signal and a frame picture as an original moving picture.

Figure 1:
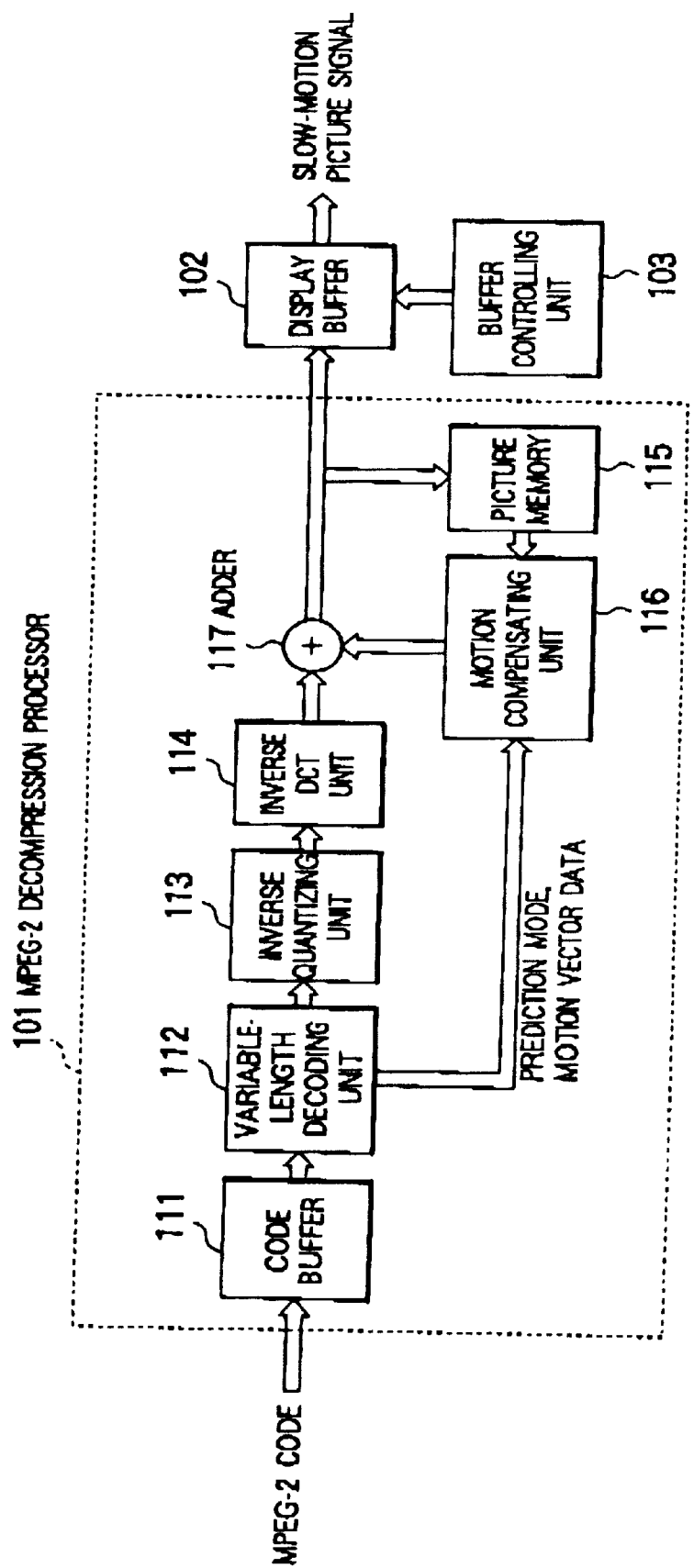
FIG. 1 is a block diagram illustrating a conventional picture signal reproducing apparatus.

Referring to FIG. 1, the conventional picture signal reproducing apparatus comprises an MPEG-2 decompression processor 101, a display buffer 102, a buffer controlling unit 103.

An MPEG-2 decompression processor 101 decodes an MPEG-2 code with reference to the motion vector data included therein to produce a decoded frame pictures. The decoded frame pictures are substantially said as the original moving pictures.

In detail, the MPEG-2 decompression processor comprises a code buffer 111, a variable-length decoding unit 112, an inverse quantizing unit 113, an inverse discrete cosine transform (IDCT) unit 114, a picture memory 115, a motion compensating unit 116, an adder 117. The MPEG-2 code is temporarily stored in the code buffer 111. The variable-length decoding unit 112 sequentially read the MPEG-2 code in the code buffer 111 and executes a variable-length decoding for the MPEG-2 code to produce variable-length decoded data and to derive the motion vector data from the MPBG-2 code. The variable-length decoded data are subjected to the inverse quantizing in the inverse quantizing unit 113 and then to an inverse DCT in the IDTC unit 114. On the other hand, the motion vector data are utilized in the motion compensating unit 116 to produce motion compensating data. In detail, the motion compensating unit 116 receives the motion vector data from the variable-length decoding unit 112 and reads one or more frame pictures stored in the picture memory 115 as a reference frame picture or pictures necessary to compensate a currently decoded frame picture. The reference frame pictures in the picture memory 115 have been already decoded and stored in the picture memory 115. The adder 11 executes an addition of the IDCT data and the motion compensating data to produce the decoded frame picture. The decoded frame picture is stored in the picture memory 115.

The display buffer 102 temporarily stores the decoded frame pictures as original frame pictures and produce the original frame pictures in sequence according to a control of the buffer controlling unit 103.

Figure 2:
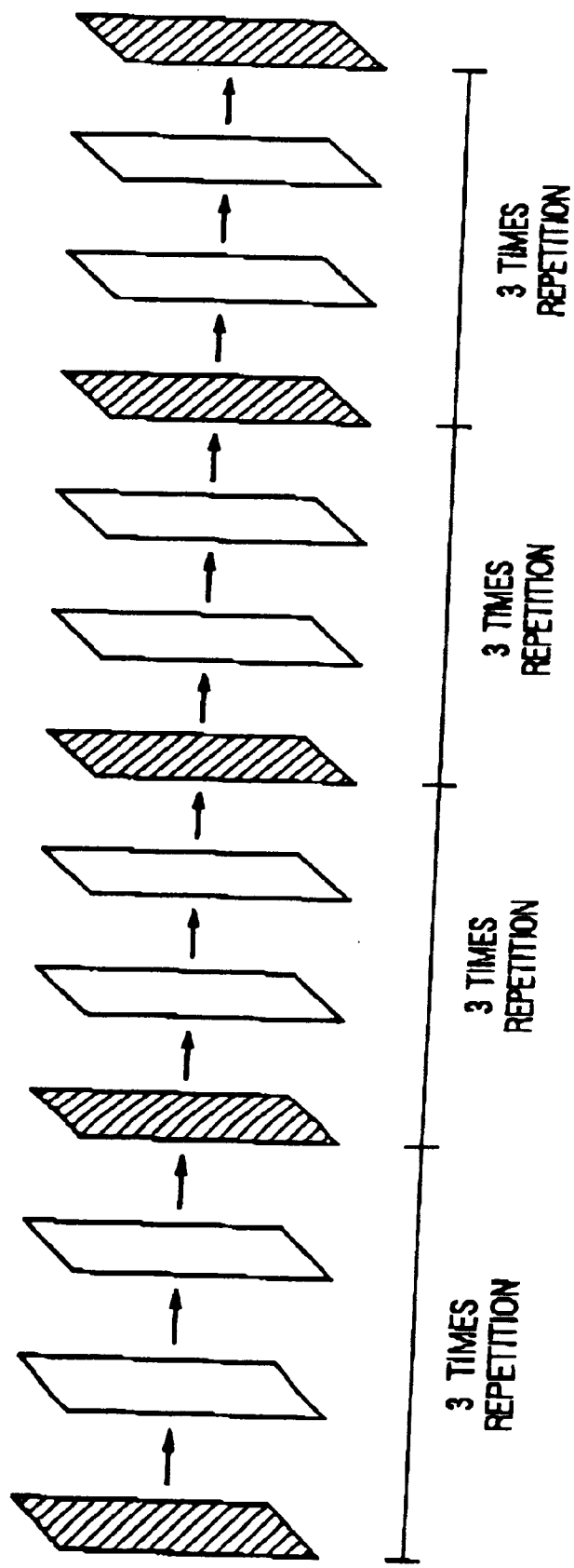
FIG. 2 is a view illustrating a conventional method for producing a slow-motion picture signal from a compression coded picture signal.

In the conventional structure, the slow-motion picture signal is produced only according to the control of the buffer controlling unit 103 for the display buffer 102. In detail, the buffer controlling unit controls the display buffer 102 to repeatedly read out each of the decoded frame pictures as a particular one of the reproduced frame pictures and an interpolation frame picture sequence the particular reproduced frame picture. The interpolation frame picture sequence comprises a plurality of interpolation frame pictures necessary to interpolate between the particular reproduced frame picture and a succeeding one of the reproduced frame pictures. For example, in three times slow motion, the interpolation frame picture sequence comprises two interpolation frame pictures, each of which in a same frame picture as the particular reproduced frame picture, as depicted to FIG. 2. Namely, the conventional picture reproducing apparatus repeatedly deliver each of the reproduced frame pictures three times in order to display in three times slow notion.

The conventional method and apparatus have problems described in the preamble.

Figure 3:
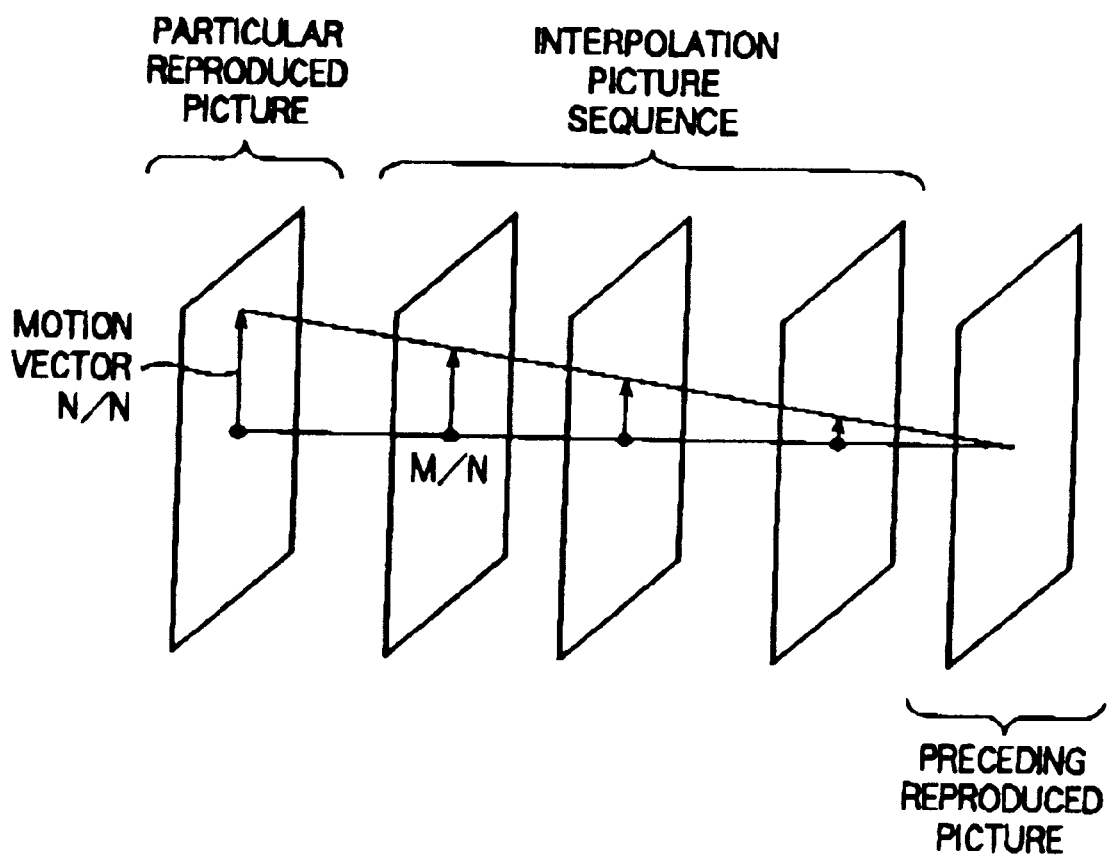
FIG. 3 is a view illustrating a method according to an embodiment of the present invention for producing a slow-notion picture signal form a compression coded picture signal.

Now, a method according to the preferred embodiment of this invention is described below with reference to FIG. 3.

The method according to this preferred embodiment of this invention roughly has three steps of calculating interpolation motion vectors adaptive for interpolation pictures from the motion vector data included in an MPEG code signal, producing interpolation frame pictures by the use of interpolation motion vectors, and interpolating the interpolation frame pictures between a particular one of the reproduced frame pictures and a preceding one of the reproduced frame pictures.

The method of the embodiment is described in detail below. The MPEG-2 code signal has the MPEG code produced by compression coding a sequence of original moving pictures or original frame pictures according to MPEG-2.

Then, MPEG-2 code signal is decoded with reference to the motion vector data to produce the sequence of reproduced frame pictures and a plurality of produced motion vectors, each of which is a motion vector between each one of the reproduced frame pictures and the preceding one of the reproduced frame pictures. The sequence of reproduced frame pictures is stored in a display buffer.

Then, (n−1) interpolation motion vectors for (n−1) interpolation frame pictures are calculated, as a sequence of interpolation motion vectors, from each one of the produced motion vectors. In this embodiment, the interpolation Motion vector sequence is defined by a linear function. The (n−1) interpolation motion vectors have vectors one though (n−1) times of a unit vector which is given by dividing the each one of the plurality of produced motion vectors by n. Namely, the (n−1) interpolation motion vectors are represented by v/n, 2*v/n, 3*v/n, . . . , m*v/n, . . . , (n−1)*v/n, where v/n represents the unit vector while m represents a natural number smaller than n.

After that, (n−1) interpolation frame pictures are produced, as an interpolation frame picture sequence, from the interpolation motion vector sequence and the preceding reproduced frame picture.

For different ones of the reproduced frame pictures, repeating the just above-mentioned two processes for calculating (n−1) interpolation motion vectors and producing (n−1) interpolation frame pictures, the plurality of interpolation frame picture sequences are all produced.

The plurality of interpolation frame picture sequences are temporarily stored in the display buffer, and then the sequence of reproduced frame pictures and the plurality of interpolation frame picture sequences are read out in the prescribed order and are therefore combined to produce the glow-motion picture signal.

Thus, the method according to the present invention can produce the slow-motion picture signal which can provide the slow-notion picture in which objects smoothly move.

Figure 4:
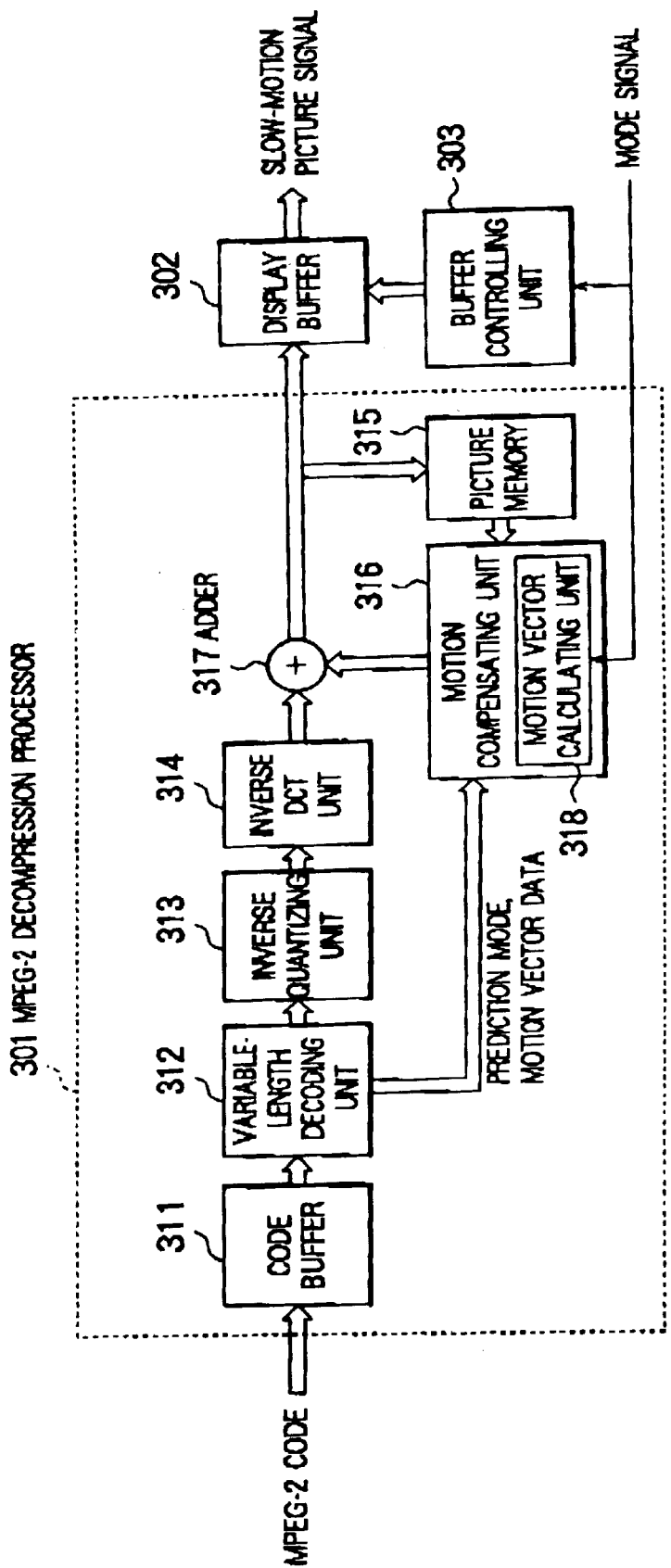
FIG. 4 is a block diagram view illustrating a picture signal reproducing apparatus according to an embodiment of the present invention.

Referring to FIG. 4, an example of a picture signal reproducing apparatus, in which the method of this embodiment is implemented, comprises a MPEG-2 decompression processor 301, a display buffer 302, and a buffer controlling unit 23. In the normal mode for reproducing a normal speed motion picture signal, the picture signal reproducing apparatus according to the present invention processes the MPEG code signal in the manner similar to the conventional apparatus. Therefore, the following description is directed to a slow-motion mode for producing a slow-motion picture signal from the MPEG code signal in slow-motion mode.

An MPEG-2 decompression processor 301 decodes an MPEG-2 code with reference to the motion vector data included therein to produce a slow-motion picture signal having a group of decoded pictures and a plurality of interpolation picture sequences. In detail, the MPEG-2 decompression processor comprises a code buffer 311, a variable-length decoding unit 312, an inverse quantizing unit 313, an inverse discrete cosine transform (IDCT) unit 314, a picture memory 315, a motion compensating unit 316, an adder 317, and a motion vector calculating unit 318. In this example, the apparatus acts in the slow-motion node when a slow-mode signal indicative of the slow-motion mode is inputted into the motion vector calculating unit 318 and the buffer controlling unit 303.

The code buffer 311, the variable-length decoding unit 312, the inverse quantizing unit 313, and the inverse DCT unit 314 operate in the similar manner as those in the conventional apparatus. Namely, the MPEG-2 code is temporarily stored in the code buffer 311. The variable-length decoding unit 312 sequentially reads the MPEG-2 code in the code buffer 311 and executes a variable-length decoding for the MEG2 code to derive the motion vector data from the MPEG-2 code. The variable-length decoded data is subjected to the inverse quantizing in the inverse quantizing unit 313 and then to the inverse DCT in the XDCT unit 314 to produce IDCT data for the adder 317.

The motion vector data from the variable-length decoding unit 312 is utilized in the motion compensating unit 316 to produce motion compensating data in the similar manner an the conventional technique. In this example, the motion vector data are further utilized, to calculate the interpolation motion vector sequences, in the motion vector calculating unit 319 set up within the motion compensating unit 316. In detail, the motion compensating unit 316 receives the motion vector data from the variable-length decoding unit 312 and produces a plurality of the motion vectors as a plurality of produced motion vectors. Each one of the plurality of produced motion vectors is a motion vector between the each one decoded picture and the preceding decoded picture. And then the motion compensating unit 316 sends the motion vectors to the motion vector calculating unit 318.

The notion vector calculating unit 318 calculates a plurality of interpolation motion vector groups from the plurality of produced motion vectors, respectively. Each one of the plurality of interpolation motion vector groups comprises (n–1) interpolation motion vectors for the (n–1) interpolation pictures as the each one interpolation picture sequence.

The motion compensating unit 316 receives the (n–1) interpolation motion vectors and reads the each decoded picture in the picture memory 315 to produce the motion compensating data for the sequence of interpolation pictures, every the decoded picture. As it in understood by this description, it is necessary that the each decoded picture has been already decoded and stored in the picture memory 315 when the data for the interpolated frame picture sequence is produced by the motion compensating unit 316 in the present apparatus.

The adder 317 executes an addition of the IDCT data and the motion compensating data to produce the sequence of the interpolation frame pictures.

The display buffer 302 temporarily stores the sequence of the interpolation frame pictures, as well an the reproduced frame pictures.

Thus, the sequence of the reproduced frame pictures and a plurality of interpolation frame picture sequences are stored in the display buffer 302. The buffer controlling unit 304 controls the display buffer 302 to produce the slow-motion picture signal by combining the sequence of reproduced frame pictures and the plurality of the interpolation frame picture sequences.

As clearly understood from the description, the apparatus carries out the steps of the method according to this embodiment. Namely, the step of decoding the MPEG-2 code is achieved by the motion compensating unit 316 while the step of calculating the (n–1) interpolation motion vectors is achieved by the motion vector calculating unit 318. The step of producing the (n–1) interpolation pictures is achieved by the motion compensating unit 316. Needless to may, both of the motion vector calculating unit 318 and the motion compensating unit 316 repeatedly execute the steps for every the produced motion vectors The step of combining the sequence of reproduced pictures and the plurality of interpolation picture sequences to produce the slow-motion picture signal is achieved by the display buffer 302 and the buffer controlling unit 303.

Thus, the apparatus of this invention can produce the slow-motion picture signal providing the slow-motion pictures in which objects smoothly move, because of the interpolation employed adaptive interpolation motion vectors.

While this invention has thus been described in conjunction with a preferred embodiment thereof, it will readily be possible for those skilled in the art to put this invention into practice in various other manners. For example, the interpolation vectors may be defined by a various other function such as a quadratic function if the resultant interpolation pictures make a slow-motion picture signal smoothly changing. Further, each of the pictures may be treated on the basis of field picture because a compression coding system such the MPEG-2 standard allows dealing with not only frame pictures but also field pictures. The compression coded picture signal may be a motion picture signal coded according to MPEG-1.

What is claimed is:

1. A method for producing a slow-motion picture signal from a compression coded picture signal produced by a compression coding a sequence of original moving pictures, said compression coded picture signal having motion vector data, said slow-motion picture signal comprising a sequence of reproduced pictures of said sequence of original moving pictures and a plurality of interpolation picture sequences each comprising (n–1), n being a natural number, interpolation pictures, each one of said plurality of interpolation picture sequences being interpolated between each one of said reproduced pictures and a preceding one of said reproduced pictures immediately preceding said each one reproduced picture, comprising steps of:

(a) decoding said compression coded picture signal with reference to said motion vector data to produce said sequence of reproduced pictures and a motion vector, as a produced motion vector, between said each one reproduced picture and said preceding reproduced picture;

(b) calculating, from said produced notion vector, (n−1) interpolation motion vectors for said (n−1) interpolation pictures, respectively;

(c) producing, from said (n−1) interpolation motion vectors and said each one reproduced picture, said (n−1) interpolation pictures;

(d) producing said plurality of interpolation picture sequences by repeatedly executing said steps (b) and (c) for different ones of solid reproduced pictures; and (e) combining said sequence of reproduced pictures and said plurality of interpolation picture sequences to produce said slow-motion picture signal.

2. The method as claimed in claim 1, wherein said (n−1) interpolation motion vectors represent m/n, m being 1 to (n−1), of said produced motion vector, respectively.

3. The method as claimed in claim 1, wherein said compression coded picture signal is a motion picture signal coded according to MPEG2.

4. The method as claimed in claim 1, wherein each of said pictures is treated on the basis of a picture frame.

5. The method as claimed in claim 1, wherein each of said pictures is treated on the basis of a picture field.

6. A picture signal producing apparatus for producing a slow-motion picture signal from a compression coded picture signal produced by a compression coding a sequence of original moving pictures, said compression coded picture signal having motion vector data, said slow-motion picture signal comprising a sequence of reproduced pictures of said sequence of original moving pictures and a plurality of interpolation picture sequences each comprising (n−1), n being a natural number, interpolation pictures, each one of said plurality of interpolation picture sequences being interpolated between each one of said reproduced pictures and a preceding one of said reproduced pictures immediately preceding said each one reproduced picture, comprising:

decoding means for decoding said compression coded picture signal with reference to said motion vector data to produce said sequence of reproduced pictures and a plurality of produced motion vectors, each of which is a motion vector between said each one reproduced picture and said preceding reproduced picture;

calculating means for calculating, from said plurality of produced notion vectors, a plurality of interpolation motion vector groups, respectively, each one of said plurality of interpolation motion vector groups comprising (n−1) interpolation motion vectors for said (n−1) interpolation pictures of said each one interpolation picture sequence;

producing means for producing, from each one of said plurality of interpolation motion vectors and said each one reproduced picture, said each one interpolation picture signal to thereby produce said plurality of interpolation picture sequences for every said reproduced picture;

storing means for temporarily storing said sequence of reproduced pictures from said decoding means and said plurality of interpolation picture sequences from said producing means;

combining means for combining said sequence of reproduced pictures and said plurality of interpolation picture sequences from said storing means to produce said slow-motion picture signal.

7. An apparatus as claimed in claim 6, wherein said (n−1) interpolation motion vectors represent m/n, m being 1 to (n−1), of said produced motion vector, respectively.

8. An apparatus as claimed in claim 6, wherein said compression coded picture signal is a motion picture signal coded according to MPEG 2.

9. An apparatus as claimed in claim 6, wherein each of said pictures is treated on the basis of a picture frame.

10. An apparatus as claimed in claim 6, wherein each of said pictures is treated on the basis of a picture field.

11. A picture signal decompression processor for processing, into a slow-motion picture data with a decompression process, a compression coded picture data produced by a compression coding a sequence of original moving pictures, said compression coded picture data having motion vector data, said slow-motion picture data comprising a group of decoded pictures, which are substantially the same pictures as said original moving pictures, and a plurality of interpolation picture sequences each comprising (n−1), n being a natural number, interpolation pictures, each one of said plurality of interpolation picture sequences being interpolated between each one of said decoded pictures and a preceding one of said decoded pictures corresponding to a preceding one of said original moving pictures, said preceding original moving picture immediately preceding said each one original moving picture in said sequence, comprising:

decoding means for decoding said compression coded picture data with reference to said motion vector data to produce said group of decoded pictures and a plurality of produced lotion vectors, each of which is a motion vector between said each one decoded picture and said preceding decoded picture;

calculating means for calculating, from said plurality of produced motion vectors, a plurality of interpolation motion vector groups, respectively, each one of said plurality of interpolation motion vector groups comprising (n−1) interpolation motion vectors for said (n−1) interpolation pictures of said each one interpolation picture sequence;

producing means for producing, from said (n−1) interpolation motion vectors and said each one decoded picture, said (n−1) interpolation pictures, every said decoded picture.

* * * * *

UNITED STATES PATENT AND TRADEMARK OFFICE
CERTIFICATE OF CORRECTION

PATENT NO.  : 5,982,440
DATED       : January 14, 2000
INVENTOR(S) : Masayuki Aoki It is certified that error appears in the above-identified patent and that said Letters Patent is hereby corrected as shown below:

Column 1, Line 59: "notion" should read --motion--
Column 2, Line 66: "slow-notion" should read --slow- motion--
On The Title Page, [57] Abstract, Line 1: "front" should read --from--
On The Title Page, [57] Abstract, Line 9: "and in" should read --and is--
Column 1, Line 24: "(MPEC)" should read --(MPEG)
Column 3, Line 35: "MPBG-2" should read --MPEG-2--
Column 4, Line 60: "glow-motion" should read --slow- motion--
Column 4, Line 63: "slow-notion" should read --slow- motion--
Column 5, Line 29: "MEG 2 should read --MPEG-2--
Column 5, Line 32: "XDCT" should read --IDCT--
Column 5, Line 40: "319" should read --318--
Column 5, Line 50: "notion" should read --motion--
Column 6, Line 24: "vectors The" should read --vectors. The--
Column 7, Line 1: "notion" should read --motion--
Column 7, Line 10: "solid" should read --said--
Column 7, Line 19: "MPEG2" should read --MPEG-2
Column 7, Line 44: "notion" should read --
Column 8, Line 15: "MPEG 2" should read --MPEG-2--
Column 8, Line 40: "lotion" should read --motion--

Signed and Sealed this

Twelfth Day of September, 2000

Attest:

Q. TODD DICKINSON

*Attesting Officer*     *Director of Patents and Trademarks*